US011862053B2

(12) United States Patent
Huang et al.

(10) Patent No.: US 11,862,053 B2
(45) Date of Patent: Jan. 2, 2024

(54) DISPLAY METHOD BASED ON PULSE SIGNALS, APPARATUS, ELECTRONIC DEVICE AND MEDIUM

(71) Applicant: SPIKE VISION (BEIJING) TECHNOLOGY CO., LTD., Beijing (CN)

(72) Inventors: Tiejun Huang, Beijing (CN); Lei Ma, Beijing (CN)

(73) Assignee: SPIKE VISION (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/088,887

(22) Filed: Dec. 27, 2022

(65) Prior Publication Data

US 2023/0137379 A1 May 4, 2023

Related U.S. Application Data

(63) Continuation of application No. PCT/CN2021/140757, filed on Dec. 23, 2021.

(51) Int. Cl.
*G09G 3/20* (2006.01)

(52) U.S. Cl.
CPC ....... *G09G 3/20* (2013.01); *G09G 2340/0407* (2013.01)

(58) Field of Classification Search
CPC .......................... G09G 3/20; G09G 2340/0407
See application file for complete search history.

(56) References Cited

U.S. PATENT DOCUMENTS 4,339,184 A 7/1982 Bagdis
5,280,167 A 1/1994 Dubois
10,523,972 B2 12/2019 Huang
11,082,641 B2 8/2021 Strand et al.
2018/0240220 A1* 8/2018 Katori ........................ G06T 7/70
2018/0240252 A1* 8/2018 Lee ........................... G09G 3/20
2018/0240377 A1* 8/2018 Xu ....................... G02F 1/13306
2018/0240398 A1* 8/2018 Machida .................. G09G 3/32
2018/0240414 A1* 8/2018 Yang ..................... G09G 3/3648
2018/0240529 A1* 8/2018 Wang ..................... G11C 19/28
(Continued)

FOREIGN PATENT DOCUMENTS

CN 107315170 A 11/2017
CN 108631868 A 10/2018
CN 109039980 A 12/2018
(Continued)

*Primary Examiner* — Sejoon Ahn
(74) *Attorney, Agent, or Firm* — Leydig, Voit & Mayer, Ltd.

(57) ABSTRACT

A display method is provided. The display method includes: obtaining information of a target display array on a display device, the target display array including a first number of display units arranged; obtaining target pulse sequences that characterize dynamic spatiotemporal information; determining display state information of each display unit in the first number of display units from a spatiotemporal relationship between the target pulse sequences and the target display array; and causing visualization of pulse signals in the target pulse sequences on the display device based on the display state information of each display unit in the first number of display units.

20 Claims, 8 Drawing Sheets

(56) References Cited

U.S. PATENT DOCUMENTS

2019/0269380 A1 9/2019 Li et al.

FOREIGN PATENT DOCUMENTS

| | | | |
|---|---|---|---|
| CN | 109068024 | A | 12/2018 |
| CN | 109803096 | A | 5/2019 |
| CN | 110178172 | A | 8/2019 |
| CN | 110534054 | A | 12/2019 |
| CN | 110545171 | A | 12/2019 |
| CN | 111063290 | A | 4/2020 |
| CN | 111510773 | A | 8/2020 |
| CN | 111583851 | A | 8/2020 |
| CN | 112002277 | A | 11/2020 |
| CN | 112687222 | A | 4/2021 |
| CN | 113362760 | A | 9/2021 |
| JP | 200889956 | A | 4/2008 |
| JP | 2019506802 | A | 3/2019 |
| KR | 1020160020289 | A | 2/2016 |
| KR | 1020170126959 | A | 11/2017 |
| KR | 1020200054320 | A | 5/2020 |
| WO | 2016024802 | A1 | 2/2016 |
| WO | 2019185935 | A1 | 10/2019 |

* cited by examiner

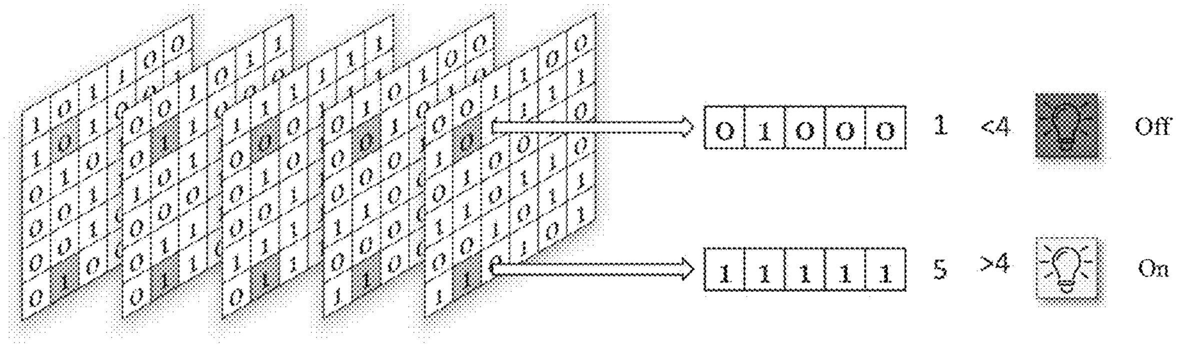
FIG. 7
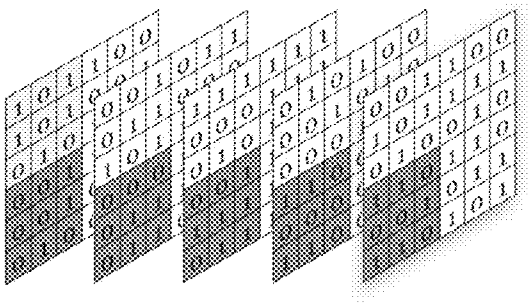
| | | | | | |
|---|---|---|---|---|---|
| 1*1+0*2+1*1+ 1*2+0*4+1*2+ 0*1+1*2+0*1= 8 | 0*1+0*2+1*1+ 1*2+1*4+1*2+ 1*1+0*2+1*1= 11 | 1*1+1*2+1*1+ 0*2+0*4+0*2+ 0*1+1*2+0*1= 6 | 0*1+1*2+0*1+ 0*2+0*4+1*2+ 0*1+0*2+0*1= 4 | 0*1+0*2+1*1+ 1*2+0*4+1*2+ 0*1+1*2+0*1= 7 | 36 |
| 0*1+0*2+1*1+ 0*2+0*4+1*2+ 0*1+1*2+0*1= 5 | 0*1+0*2+0*1+ 0*2+1*4+1*2+ 0*1+1*2+1*1= 9 | 0*1+0*2+1*1+ 1*2+1*4+1*2+ 0*1+1*2+1*1= 12 | 1*1+1*2+0*1+ 0*2+0*4+0*2+ 1*1+1*2+0*1= 6 | 1*1+1*2+0*1+ 0*2+0*4+1*2+ 1*1+1*2+0*1= 8 | 40 |
FIG. 8
| | | | | | |
|---|---|---|---|---|---|
| 1 | 0 | 1 | 1 | 0 | 0 |
| 1 | 0 | 1 | 0 | 0 | 1 |
| 0 | 1 | 0 | 1 | 0 | 1 |
| 0 | 0 | 1 | 1 | 0 | 0 |
| 0 | 0 | 1 | 0 | 0 | 1 |
| 0 | 1 | 0 | 0 | 0 | 0 |
| | | | | | |
|---|---|---|---|---|---|
| 0 | 0 | 1 | 0 | 1 | 1 |
| 0 | 1 | 1 | 0 | 0 | 0 |
| 1 | 0 | 1 | 1 | 1 | 0 |
| 0 | 0 | 0 | 1 | 0 | 0 |
| 0 | 1 | 1 | 1 | 0 | 1 |
| 0 | 1 | 1 | 0 | 1 | 1 |
| | | | | | |
|---|---|---|---|---|---|
| 1 | 1 | 1 | 1 | 1 | 1 |
| 0 | 0 | 0 | 1 | 1 | 1 |
| 0 | 1 | 0 | 1 | 0 | 0 |
| 0 | 0 | 1 | 1 | 1 | 0 |
| 1 | 1 | 1 | 1 | 0 | 0 |
| 0 | 1 | 1 | 1 | 0 | 1 |
| | | | | | |
|---|---|---|---|---|---|
| 0 | 1 | 0 | 1 | 0 | 0 |
| 0 | 0 | 1 | 0 | 1 | 0 |
| 0 | 0 | 0 | 1 | 1 | 0 |
| 1 | 1 | 0 | 0 | 1 | 1 |
| 0 | 0 | 0 | 0 | 1 | 1 |
| 1 | 1 | 0 | 0 | 0 | 0 |
| | | | | | |
|---|---|---|---|---|---|
| 0 | 0 | 1 | 1 | 0 | 0 |
| 1 | 0 | 1 | 1 | 1 | 1 |
| 0 | 1 | 0 | 0 | 1 | 0 |
| 1 | 1 | 0 | 1 | 1 | 0 |
| 0 | 0 | 1 | 0 | 1 | 1 |
| 1 | 1 | 0 | 1 | 0 | 1 |
FIG. 9

DISPLAY METHOD BASED ON PULSE SIGNALS, APPARATUS, ELECTRONIC DEVICE AND MEDIUM

CROSS-REFERENCE TO RELATED APPLICATIONS

This application is a continuation of International Patent Application No. PCT/CN2021/140757, filed on Dec. 23, 2021, which claims priority to Chinese Patent Application No. 202011581997.6, filed on Dec. 28, 2020. All of the afore-mentioned patent applications are hereby incorporated by reference in their entireties for all purposes.

TECHNICAL FIELD

The present disclosure relates to the technical field of data processing, in particular to a display method based on pulse signals, an apparatus, an electronic device and a medium.

BACKGROUND

Video technology is widely used. Due to its design concept, traditional video technology has become increasingly incompetent to meet the needs of current visual tasks. Specifically, the traditional video technology features a complete sampling of the scene at a preset fixed frequency. This sampling approach often fails to reflect the dynamic changes of the scene, and is prone to over-sampling or under-sampling the scene, resulting in a variety of problems such as large redundancy of video data, low time-domain resolution and blurring under high-speed motion.

On the other hand, most of the existing display devices display the image sequence signal captured in a traditional way in 8-bit or 16-bit RGB mode. This does not match the target pulse sequence signal that is a new visual information expression approach, resulting in a failure to directly visualize the target pulse sequences that serve as a signal source. To realize the display of the target pulse sequence signal with the existing display system, it is often necessary to reconstruct the target pulse sequence signal into an image sequence signal. The image reconstruction process loses the information carried by the original pulse signals and cannot accurately reproduce a change process of the original optical signals of the recorded scene.

SUMMARY

Embodiments of the present disclosure provide a display method based on pulse signals, an apparatus, an electronic device and a medium.

According to an aspect of the present disclosure, a display method is provided. The display method includes: obtaining information of a target display array on a display device, the target display array including a first number of display units arranged; obtaining target pulse sequences that characterize dynamic spatiotemporal information; determining display state information of each display unit in the first number of display units from a spatiotemporal relationship between the target pulse sequences and the target display array; and causing visualization of pulse signals in the target pulse sequences on the display device based on the display state information of each display unit in the first number of display units.

According to an aspect of the present disclosure, an electronic device is provided. The electronic device comprises: one or more processors; one or more memories storing one or more programs, which when executed by the one or more processors, cause the electronic device to perform operations including: obtaining information of a target display array on a display device, the target display array including a first number of display units arranged; obtaining target pulse sequences that characterize dynamic spatiotemporal information; determining display state information of each display unit in the first number of display units from a spatiotemporal relationship between the target pulse sequences and the target display array; and causing visualization of pulse signals in the target pulse sequences on the display device based on the display state information of each display unit in the first number of display units.

According to an aspect of the present disclosure, a non-transitory computer-readable storage medium storing computer instructions is provided. The one or more programs comprising instructions, which when executed by one or more processors of an electronic device, cause the electronic device to perform operations including: obtaining information of a target display array on a display device, the target display array including a first number of display units arranged; obtaining target pulse sequences that characterize dynamic spatiotemporal information; determining display state information of each display unit in the first number of display units from a spatiotemporal relationship between the target pulse sequences and the target display array; and causing visualization of pulse signals in the target pulse sequences on the display device based on the display state information of each display unit in the first number of display units.

The technical solutions of the present disclosure will be described in further detail below with reference to the accompanying drawings and embodiments.

BRIEF DESCRIPTION OF DRAWINGS

The accompanying drawings, which form a part of the specification, illustrate embodiments of the disclosure and, together with the description, serve to explain the principles of the disclosure.

The present disclosure may be more clearly understood from the following detailed description with reference to the accompanying drawings, in which:

FIG. 7 is a schematic display diagram of a display method based on pulse signals according to another embodiment of the present disclosure;

FIG. 8 is a schematic diagram of determining an accumulated pulse signal value according to an embodiment of the present disclosure;

FIG. 9 is a schematic diagram of target pulse sequences according to another embodiment of the present disclosure;

DETAILED DESCRIPTION OF THE EMBODIMENTS

Various example embodiments of the present disclosure will now be described in detail with reference to the accompanying drawings. It should be noted that the relative arrangement of the components and steps, the numerical expressions and values set forth in these embodiments do not limit the scope of the present disclosure unless specifically stated otherwise.

Meanwhile, it should be understood that for the convenience of description, the dimensions of various parts shown in the accompanying drawings are not drawn in an actual proportional relationship.

The following description of at least one example embodiment is merely illustrative in nature and is not intended to limit the present disclosure, its implementation or use in any way.

Techniques, methods, and apparatus known to those of ordinary skill in the art may not be discussed in detail, but such techniques, methods, and apparatus should be considered, where appropriate, as part of the specification.

It should be noted that same numerals and letters refer to same items in the following figures. Thus, once an item is defined in one figure, it does not require further discussion in subsequent figures.

In addition, the technical solutions of the various embodiments of the present disclosure can be combined with each other, but must be based on the enablement by those of ordinary skill in the art. When the combination of technical solutions is contradictory or cannot be realized, it should be considered that the combination of technical solutions does not exist and is not within the scope of protection claimed in this disclosure.

It should be noted that all directional indications (such as up, down, left, right, front, back) in the embodiments of the present disclosure are only used to explain the relationship between various components under a certain posture (as shown in the accompanying drawings). If the specific posture changes, the directional indication also changes accordingly.

The following describes a display method based on pulse signals according to an example embodiment of the present disclosure with reference to FIGS. 1-16. It should be noted that the following disclosure scenarios are only shown to facilitate understanding of the spirit and principles of the present disclosure, and that the embodiments of the present disclosure are not limited in this regard. Rather, the embodiments of the present disclosure can be applied to any scenario where applicable.

The present disclosure also proposes a display method based on pulse signals, an apparatus, an electronic device (e.g., a target terminal) and a medium. The method may be used for directly or indirectly displaying input signals in the form of pulse sequences via a display device, a projector, a virtual reality device and the like.

Figure 1A:
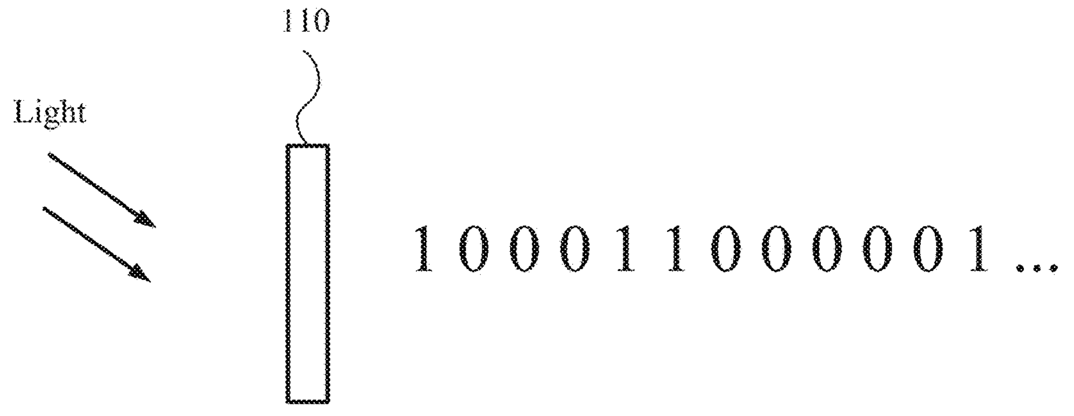
FIG. 1A is a schematic diagram of generating a pulse signal sequence by a signal collector according to an embodiment of the present disclosure.

FIG. 1A schematically shows a schematic diagram of generating a pulse signal sequence by a signal collector according to an embodiment of the present disclosure.

By means of a high-speed responsiveness of the signal collector (e.g., a photoelectric sensor), a cluster of photons may be transformed to a digital bit "1" (i.e., a pulse). The time interval between two neighboring pulses represents the intensity of the light. In the example shown in FIG. 1A, a signal collector 110 responds to the light by generating a pulse signal sequence in the form of "1 0 0 0 1 1 0 0 0 0 0 1 . . . ". Such a pulse signal sequence records the continuous variation of the intensity of the light with a high temporal resolution.

Figure 1B:
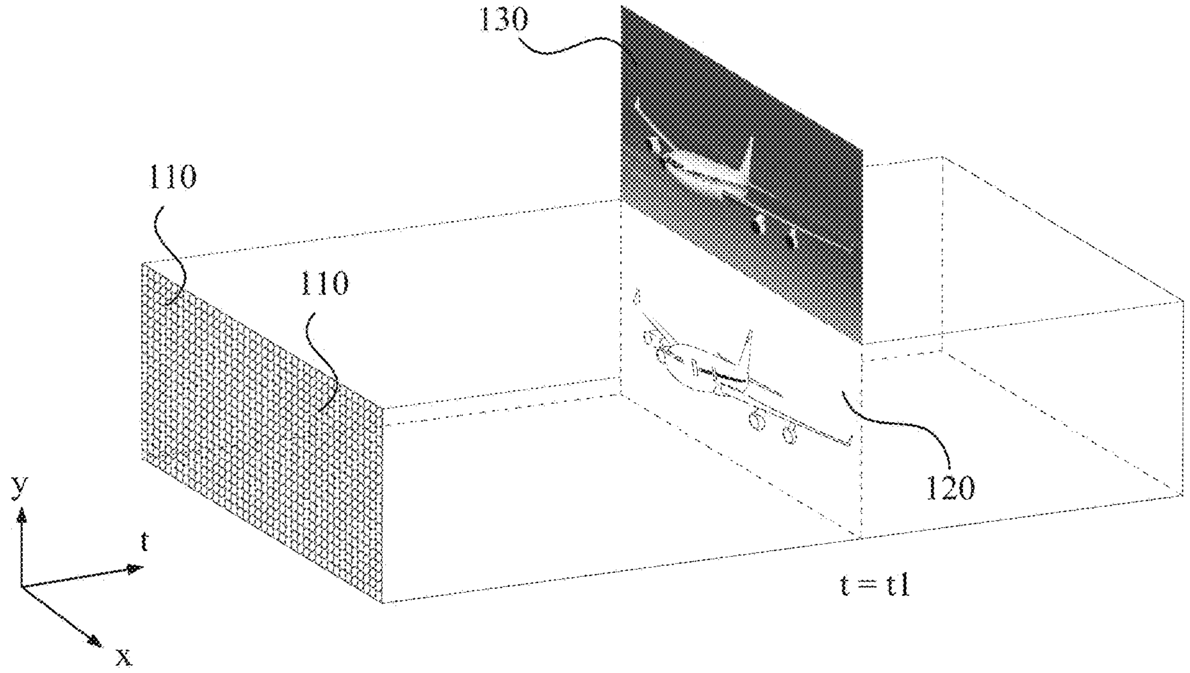
FIG. 1B is a schematic diagram of implementing high-speed imaging by an array of signal collectors according to an embodiment of the present disclosure.

FIG. 1B is a schematic diagram of implementing high-speed imaging by an array of signal collectors according to an embodiment of the present disclosure.

As shown in FIG. 1B, a plurality of pulse signal sequences may be generated by a plurality of signal collectors 110 capturing a scene, which signal collectors 110 are arranged in an array in the x-y plane and may be called as a Spike Camera. The plurality of pulse signal sequences are spatially arranged into an array of bit streams, which accurately depicts the process of light variation captured by the Spike Camera within a time period. The light intensity at a designated time (e.g., when t=t1) within the time period may be calculated from the plurality of pulse signal sequences, thereby achieving high-speed imaging of the scene. In an appropriate way, light intensity information 120 at a time recorded by the plurality of pulse signal sequences can be displayed, for example, on a display device, obtaining a visual image 130. The visualization of such pulse signal sequences will be discussed in detail in the following.

Figure 2:
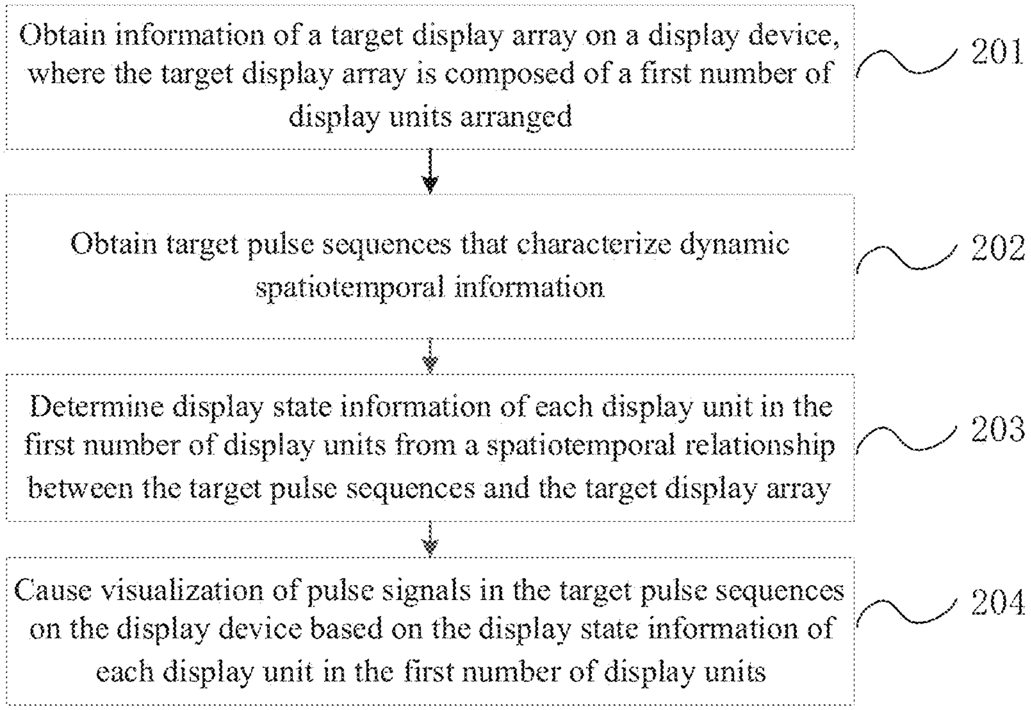
FIG. 2 is a schematic flowchart of a display method based on pulse signals according to an embodiment of the present disclosure.

FIG. 2 schematically shows a schematic flowchart of a display method based on pulse signals according to an embodiment of the present disclosure. As shown in FIG. 2, the method includes:

Step 201: obtaining information of a target display array on a display device, where the target display array includes a first number of display units arranged.

The display units in the target display array will be used to display the pulsed signals. The information of the target display array includes a display resolution and/or a display rate, etc. In one implementation, the display unit may be a pixel unit. The present disclosure does not specifically limit the first number.

Step 202: obtaining target pulse sequences that characterize dynamic spatiotemporal information.

The target pulse sequences may include multiple pulse signal sequences. In one implementation, a pulse signal sequence can be represented by 0 and 1. In another implementation, a pulse signal sequence can be represented by peaks and troughs. For example, a "0" or "trough" indicates the absence of a pulse, and a "1" or "peak" indicates the presence of a pulse.

In addition, the target pulse sequences in this disclosure are generated based on the acquisition of dynamic spatiotemporal information, for example, by a plurality of signal collectors (e.g., photosensitive devices) arranged in an array. The dynamic spatiotemporal information may be spatiotemporal signals of spatial positions collected by the plurality of signal collectors. The spatiotemporal signal may be an optical signal. More information related to the pulse sequence may be found in the inventor's U.S. Pat. No. 10,523,972 B2, entitled "METHOD AND DEVICE FOR ENCODING SPACE-TIME SIGNALS", the content of which is incorporated herein in its entirety by reference.

Further, information such as a generation rate and/or a generation resolution of the target pulse sequences may also be obtained.

Step 203: determining display state information of each display unit in the first number of display units from a spatiotemporal relationship between the target pulse sequences and the target display array.

In some embodiments, the spatiotemporal relationship between the target pulse sequences and the target display array is determined based on the generation resolution of the target pulse sequences and the display resolution of the target display array and/or based on the generation rate of the target pulse sequences and the display rate of the target display array. For example, the spatiotemporal relationship between the target pulse sequences and the target display array is determined based on the display resolution and the generation resolution of the target pulse sequences; the spatiotemporal relationship between the target pulse sequences and the target display array is determined based on the display rate and the generation rate of the target pulse sequences; or the spatiotemporal relationship between the target pulse sequences and the target display array is determined based on the display resolution and the generation resolution of the target pulse sequences, and on the display rate and the generation rate of the target pulse sequences.

The generation resolution of the target pulse sequences can be expressed as W1*H1. That is, the width and height of a pulse plane corresponding to the target pulse sequences are W1 pulse positions and H1 pulse positions, respectively, with each pulse position corresponding to the information of the spatial position of one pulse signal in the target pulse sequences. The pulse plane referred to herein may be a plane formed by respective pulse signals generated by the plurality of signal collectors arranged in an array, with each of the pulse signals occupying a respective position (i.e., the so-called pulse position) in the pulse plane. In this regard, the generation resolution of the target pulse sequences may also be referred to as a spatial resolution of the plurality of signal collectors.

The generation rate represents the number of the pulse planes per second. For example, if the generation rate is 40,000 frames per second, there are 40,000 pulse planes per second, with each pulse plane expressing the information of the optical signals in 1/40,000 second.

The display resolution of the target display array may be expressed as W2*H2. That is, the width of the target display array is W2 display units, and the height is H2 display units.

The display rate of the target display array indicates the number of pictures displayed per second. For example, if the display rate is 1,000 frames per second, then 1,000 pictures are displayed per second. The display rate may also be referred to as refresh rate.

The display state information of each display unit includes at least one of lighting-up, lighting-off, a voltage value, a luminance value, a duration of lighting-up, and the like.

Step 204: causing visualization of pulse signals in the target pulse sequences on the display device based on the display state information of each display unit in the first number of display units.

In some embodiments, a display state of the display unit can be controlled by sending a signal representing the display state to the drive circuit of the display unit according to the display state information, thereby realizing the visualization of the pulse signal.

In this disclosure, the information of the target display array, including a first number of display units arranged, on the display device can be obtained. The target pulse sequences that characterize the dynamic spatiotemporal information are obtained. The display state information of each display unit is determined from the spatiotemporal relationship between the target pulse sequences and the target display array. The visualization of the pulse signals on the display device is realized based on the display state information of each display unit. The technical solution of the present disclosure can determine the display state information of each display unit on the display device from the spatiotemporal relationship between the target pulse sequences and the target display array, so as to realize complete display of the optical signal information recorded in the target pulse sequences, thereby facilitating accurate reproduction of the change process of optical signals of an original scene. Since the process does not involve traditional image reconstruction, the disadvantage of losing the information carried by the original pulse signals in the prior art is also avoided.

Figure 3:
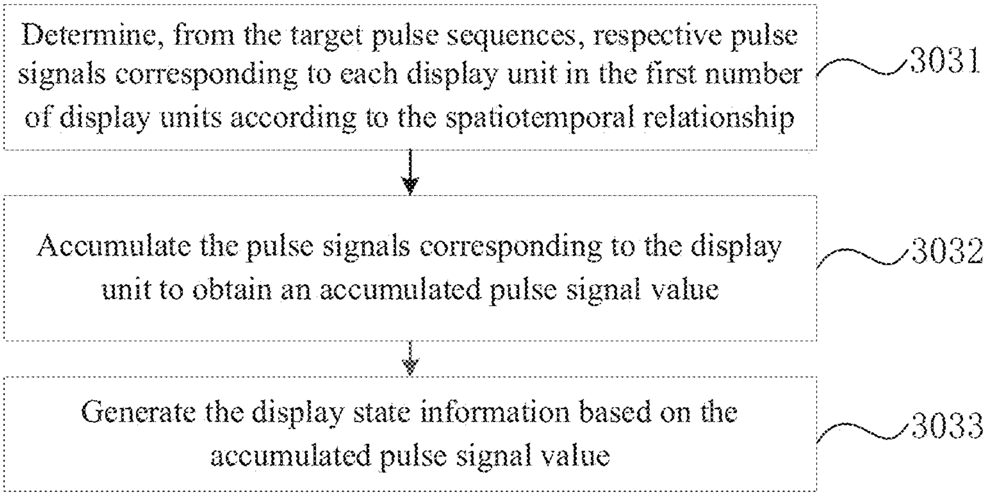
FIG. 3 is a schematic flowchart of a display method based on pulse signals according to another embodiment of the present disclosure.

As shown in FIG. 3, in some embodiments based on the above method of the present disclosure, the step 203 of determining the display state information of each display unit in the first number of display units from the spatiotemporal relationship between the target pulse sequences and the target display array includes:

Step 3031: determining, from the target pulse sequences, respective pulse signals corresponding to each display unit in the first number of display units according to the spatiotemporal relationship;

Step 3032: accumulating the pulse signals corresponding to the display unit to obtain an accumulated pulse signal value; and Step 3033: generating the display state information based on the accumulated pulse signal value.

The display state of each display unit can be controlled according to the display state information.

This embodiment may apply to a synchronous display mode in which the display control is performed synchronously on each display unit at a fixed refresh frequency.

The spatiotemporal relationship may be expressed as a spatial and/or temporal relationship between the pulse positions and the display units. In some embodiments, a spatial relationship between the target pulse sequences and the target display array may be determined based on the generation resolution of the target pulse sequences and the display resolution of the target display array. A temporal relationship between the target pulse sequences and the target display array may be determined based on the generation rate of the target pulse sequences and the display rate of the target display array.

For example, a first proportional relationship between the generation resolution of the target pulse sequences and the display resolution of the target display array is determined, and the spatial relationship between the target pulse sequences and the target display array is determined based on the first proportional relationship, which spatial relationship indicates which pulse positions on the pulse plane each display unit of the target display array corresponds to. A second proportional relationship between the generation rate of the target pulse sequences and the display rate of the target display array is determined, and the temporal relationship between the target pulse sequences and the target display array is determined based on the second proportional relationship, which temporal relationship indicates how many pulse planes each display plane corresponds to. From the spatiotemporal relationship, it can be determined which pulse signals each display unit corresponds to.

In such an embodiment of the present disclosure, the spatiotemporal relationship between the target pulse sequences and the target display array may be determined from the first proportional relationship and/or the second proportional relationship.

The accumulation of the pulse signals includes accumulating the pulse signals. The accumulation may be weighted accumulation.

In some embodiments based on the above method of the present disclosure, generating the display state information based on the accumulated pulse signal value includes: comparing the accumulated pulse signal value with a first preset threshold to obtain a comparison result; and generating the display state information based on the comparison result.

The display state information includes lighting up or not.

In some embodiments, if the accumulated pulse signal value is greater than or equal to the first preset threshold, the generated display state information is "lighting-up"; otherwise it is "not lighting-up" (i.e., "lighting-off"). For example, in the case where each display unit corresponds to one pulse position, the first preset threshold may be 1. In that case, when a pulse is present at that pulse position, the accumulated pulse signal value is 1, which is equal to the first preset threshold, and thus the display state information is lighting-up; when no pulse is present at that pulse position, the accumulated pulse signal value is 0, which is less than the first preset threshold, and thus the display state information is "not lighting-up".

In some embodiments, the display state information may also include at least one of a voltage value, a luminance value, and a duration of lighting-up. For example, if the accumulated pulse signal value is greater than or equal to a first threshold, the display state information is a first voltage value, a first luminance value and/or a first duration of lighting-up, and if the accumulated pulse signal value is greater than or equal to a second threshold, the display state information is a second voltage value, a second luminance value and/or a second duration of lighting-up.

In some embodiments based on the above method of the present disclosure, generating the display state information based on the accumulated pulse signal value includes: obtaining the display state information from a preset function of the accumulated pulse signal value. The display state information includes a lighting-up state, a lighting-off state, a voltage value, a luminance value and/or a duration of lighting-up.

In some embodiments, the preset function may be a positive proportional function, in which case a value obtained by multiplying the accumulated value by a preset value can be used as a trigger value for the lighting-up state or the lighting-off state, or the accumulated value can be directly used as the voltage value, the luminance value and/or the duration of lighting-up. Alternatively, the preset function may be other complex functions, in which case the accumulated value is input to the preset function to obtain the trigger value for the lighting-up state or the lighting-off state, the voltage value, the luminance value and/or the duration of lighting-up as the display state information.

Figure 4:
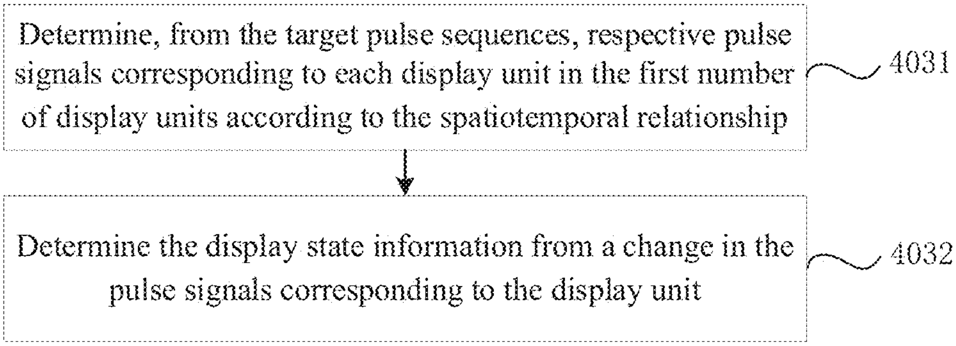
FIG. 4 is a schematic flowchart of a display method based on pulse signals according to another embodiment of the present disclosure.

As shown in FIG. 4, in some embodiments based on the above method of the present disclosure, the step 203 of determining the display state information of each display unit in the first number of display units from the spatiotemporal relationship between the target pulse sequences and the target display array includes:

Step 4031: determining, from the target pulse sequences, respective pulse signals corresponding to each display unit in the first number of display units according to the spatiotemporal relationship; and Step 4032: determining the display state information from a change in the pulse signals corresponding to the display unit.

This embodiment may apply to an asynchronous display mode, in which the display control is performed on different display units independently of each other.

Based on the generation resolution of the target pulse sequences and the display resolution of the target display array and/or based on the generation rate of the target pulse sequences and the display rate of the target display array, the spatiotemporal relationship between the target pulse sequences and the target display array are determined.

In some embodiments, a first proportional relationship between the generation resolution of the target pulse sequences and the display resolution of the target display array is determined, and the spatial relationship between the target pulse sequences and the target display array is determined based on the first proportional relationship. The spatial relationship may, for example, indicate which pulse positions on the pulse plane each display unit of the target display array corresponds to.

In this embodiment, the display rate of the target display array refers to a display rate upper limit of each display unit. As the display rate upper limit of the display unit may be lower than the generation rate of the target pulse sequences, it is possible that the display state cannot be controlled according to each change in the pulse signals. Therefore, a second proportional relationship between the generation rate of the target pulse sequences and the display rate upper limit of the display unit is determined, and the temporal relationship between the target pulse sequences and the target display array is determined based on the second proportional relationship. That is, a target pulse sequence is temporally divided into pulse signal groups, and the number of pulse signals in the pulse signal group is determined based on the second proportional relationship. For example, if the generation rate is N times the display rate, then every N (or more) pulse signals fall into a pulse signal group. The N pulse signals may be located in N pulse planes, respectively. It should be noted that the display units in the target display array may have different display rate upper limits, and that for each display unit, the pulse signal group may have a different number of pulse signals.

In some embodiments based on the above method of the present disclosure, the determining the display state information from the change in the pulse signals corresponding to the display unit includes: every time when the first preset condition is met, calculating a current value corresponding to the display unit from the pulse signals corresponding to the display unit; determining a numerical relationship between the current value corresponding to the display unit (that is, the current value) and a historical value, the historical value being the value corresponding to the display unit when the first preset condition was met last time; and determining the display state information when the numerical relationship meets a second preset condition.

In some embodiments, the first preset condition is elapse of a set duration, and the calculating the current value corresponding to the display unit from the pulse signals corresponding to the display unit includes:

accumulating the pulse signals corresponding to the display unit within the set duration to obtain an accumulated pulse signal value as the current value.

Alternatively, the first preset condition is that a cyclically accumulated value of the pulse signals received by the display unit reaches a second preset threshold that is a maximum value of the cyclic accumulation. The calculating the current value corresponding to the display unit from the pulse signals corresponding to the display unit includes: calculating the current value from a time interval between two neighboring time points at which the cyclically accumulated value of the pulse signals reaches the second preset threshold.

For example, a time point is recorded when the cyclically accumulated value reaches the second preset threshold M1, and then the time interval ΔT' from the last recorded time point is calculated every time the cyclically accumulated value reaches the second preset threshold M1. The current value Lv(T) corresponding to the display unit is calculated according to the following equation:

$$Lv(T)=C/\Delta T, \text{ where C is a constant value.}$$

In some embodiments, the numerical relationship between the current value Lv(T) corresponding to the display unit and a historical value Lv(T') includes Q(F(Lv(T))−F(Lv(T'))), where Q( ) and F( ) are functions. That is, the numerical relationship is a function value of a difference between respective function values of two values. In some embodiments, Q( ) is a function that takes an absolute value, and F( ) is a function that takes a value itself. That is, the numerical relationship is the absolute value of the difference between the current value and the historical value, expressed as |Lv(T))−Lv(T')|.

In some embodiments, the second preset condition includes greater than or equal to a third preset threshold, a function value of the current value and/or a function value of the historical value, such as one or more of the following:

$$Q(F(Lv(T))-F(Lv(T')))=M2$$

$$Q(F(Lv(T))-F(Lv(T')))>M3$$

$$Q(F(Lv(T))-F(Lv(T')))>Y(Lv(T))$$

$$Q(F(Lv(T))-F(Lv(T')))>Y(Lv(T')).$$

In the above, Q( ), F( ) and Y( ) are functions, and M2 and M3 are third preset thresholds. In an example, Y( ) is a second-order or higher-order continuous function, such as a polynomial function. In an example, if the pulse signal represents an accumulated light intensity over a period of time, the third preset threshold here may be a ratio of a previously recorded accumulated light intensity to a display luminance. This allows the display to reproduce the original light intensity over a certain period of time.

Once the numerical relationship meets the second preset condition, the display state information is generated, and the display state of the display unit is controlled according to the display state information. The display state information includes a lighting-up state, a lighting-off state, a voltage value, a luminance value and/or a duration of lighting-up.

The display state information may be calculated from the current value corresponding to the display unit, the numerical relationship between the current value corresponding to the display unit and the historical value, and/or the historical value for the display unit.

For example, determining the display state information when the numerical relationship meets the second preset condition includes: determining the display state information based on the current value when the numerical relationship meets the second preset condition.

Further, the causing the visualization of the pulse signals in the target pulse sequences on the display device based on the display state information of each display unit in the first number of display units includes: controlling the display state of the display unit according to the display state information to realize the visualization of pulsed signals in the target pulse sequences on a display device.

Further, some examples are described below for illustration in order to facilitate the understanding of the technical solutions of the present disclosure. In the following, examples 1 to 3 relate to synchronous display modes, and examples 4 to 7 relate to asynchronous display modes. In the figures, "X" represents an unknown state.

EXAMPLE 1

Figure 5:
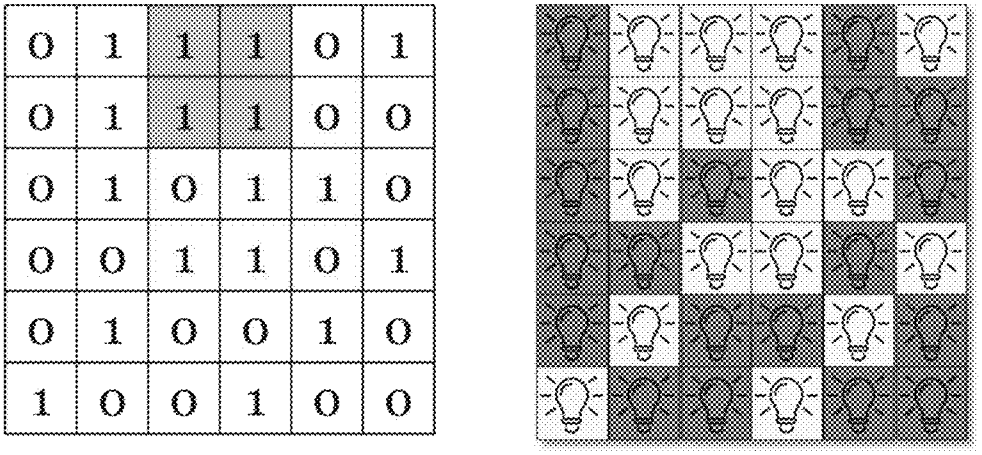
FIG. 5 is a schematic display diagram of a display method based on pulse signals according to an embodiment of the present disclosure.

In the example of FIG. 5, the generation rate V1 of the target pulse sequences is the same as the display rate V2 of the target display array, and the generation resolution R1 of the target pulse sequences is the same as the display resolution R2 of the target display array. The light-emitting state signal includes On and Off.

The ratio of the generation rate V1 to the display rate V2 is 1, and the ratio of the generation resolution R1 to the display resolution R2 is 1. Thus, the spatiotemporal relationship is determined as follows.

The target display array corresponds to one pulse plane of the input target pulse sequences, with each display unit corresponding to one pulse signal at one pulse position on the pulse plane. The display unit is, for example, a pixel unit.

The first preset threshold is 1. If the pulse signal is 1, then the accumulated pulse signal value is 1, and the display state information is lighting-up to control the corresponding display unit to light up. If the pulse signal is 0, then the accumulated pulse signal value is 0, and the display state information is lighting-off.

EXAMPLE 2

Figure 6:
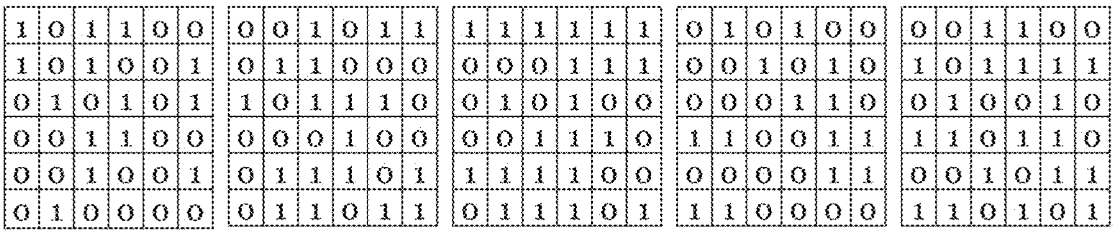
FIG. 6 is a schematic diagram of target pulse sequences according to an embodiment of the present disclosure.

In the example of FIG. 6, the generation resolution R1 of the target pulse sequences is the same as the display resolution R2 of the target display array, both of which are 6*6 (i.e., W=H=6). The generation rate V1 of the target pulse sequences is equal to 40,000 frames/second, and the display rate V2 of the target display array is equal to 8,000 frames/second.

For the pulse signals during 5/40,000 seconds (the number 5/40,000 here is based on the fact that a pulse frame is generated every 1/40,000 seconds and that 5 pulse frames are illustrated in FIG. 6), according to their input order, the target pulse sequences as shown in FIG. 6 can be obtained (the pulse signals that are input first come first, and the pulse signals that are input later come later).

According to the resolution of 6*6 and the input order, the target pulse sequences correspond to 5 pulse planes (pulse frames) as shown in FIG. 6, with the pulse planes input first being on the left, and the pulse planes input later being on the right. As shown in FIG. 7, with the resolutions being the same, each display unit spatially corresponds to one pulse position in a pulse plane. With V1/V2=5, each display unit temporally corresponds to five pulse signals at that pulse position in the pulse plane (i.e., five pulse signals). The five pulse signals are accumulated, and the display state information is generated from the accumulated value (i.e., accumulated pulse signal value). Taking the two regions (2, 2) and (6, 2) in the target pulse sequences as an example, the first preset threshold is set to 4.

As shown in FIG. 7, the five pulse signals at the position (2, 2) are {0 1 0 0 0}, and the accumulated value is 1, which is less than the first preset threshold value of 4. Then, the display state information is generated to be lighting-off. The display signal is in the form of (2, 2, Off), for example, and the corresponding display unit is not lit up. The five pulse signals at the position (6, 2) are {1 1 1 1 1}, and the accumulated value is 5, which is greater than the first preset threshold value of 4. Then, the display state information is generated to be lighting-up. The display signal is in the form of (6, 2, On), for example, and the corresponding display unit is lit up.

EXAMPLE 3

In the example of FIG. 8, the generation resolution R1 of the input target pulse sequences is 6*6, and the display resolution R2 of the target display array is 2*2. The generation rate V1 of the target pulse sequences is equal to 40,000 frames/second, and the display rate V2 of the target display array is equal to 8,000 frames/second. The display state information includes a voltage value.

The received target pulse sequences are the same as in Embodiment 2. With the ratio of resolution R1/R2=9, each display unit corresponds to nine pulse positions in the pulse plane. With V1/V2=5, each display unit corresponds to pulse signals at the same position in five pulse planes. In this case, the pulse signals at the same nine pulse positions in five pulse planes are accumulated. A weighted accumulation is used, in which the pulse signals at different pulse positions have different weights. The weight matrix is:

| | | |
|---|---|---|
| 1 | 2 | 1 |
| 2 | 4 | 2 |
| 1 | 2 | 1 |

For the display units at positions (1, 1) and (2, 1), the accumulated pulse signal values are 36 and 40, respectively, and the display state information generated by multiplying a preset voltage value are {1, 1, 36*V} and {2, 1, 40*V}, respectively, where V is the preset voltage value. Alternatively, the display state information generated by functional calculation is {1, 1, 0.45*V} and {2, 1, 0.5*V}, respectively, where 0.45=36/80, 0.5=40/80, and 80=(1*1+2*1+1*1+2*1+4*1+2*1+1*1+2*1+1*1)*5. The number 80 corresponds to the upper limit of the maximum accumulated pulse signal that can be reached when the pulse signals at the 9 pulse positions are all 1. V is the preset voltage value.

It should be noted that in the embodiments of the present disclosure, the display state information may also include a light-emitting duration, the calculation of which is the same as that of the voltage value.

EXAMPLE 4

In the example of FIG. 9, the generation resolution R1 of the input target pulse sequences is the same as the display resolution R2 of the target display array, both of which are 6*6 (i.e., W=H=6). The generation rate V1 of the target pulse sequences and the display rate upper limit V2 of the target display array are both 40,000 frames/second.

Figure 10:
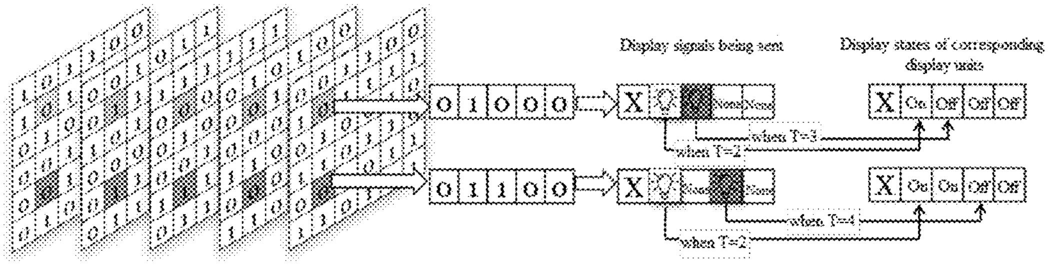
FIG. 10 is a schematic display diagram of the display method based on pulse signals according to another embodiment of the present disclosure.

For the pulse signals within 5/40,000 seconds (the number 5/40,000 here is based on the fact that a pulse frame is generated every 1/40,000 seconds and that 5 pulse frames are illustrated in FIG. 9), the target pulse sequences correspond to 5 pulse planes (pulse frames) according to the resolution 6*6 and the input order. As shown in FIG. 10, with the resolutions being the same, each display unit spatially corresponds to one pulse position in a pulse plane. The set duration in the first preset condition is 1/40,000 seconds, and a number of pulse signals received within the set duration is accumulated as the current value for the display unit, including two cases: either 0 or 1. In other words, the current value corresponding to the display unit can be determined from the current pulse signal for the display unit. For example, if the pulse signal is 0, the current value is 0, and if the pulse signal is 1, the current value is 1. The numerical relationship between the current value and the historical value is calculated as the absolute value of their difference. The second preset condition includes whether the absolute value is equal to 1. When the second preset condition is met, the display state information is generated from the current value: lighting-up when the current value is 1, and lighting-off when the current value is 0. When the second preset condition is not met, no display state information is generated.

As shown in FIG. 10, when two consecutive pulse signals in the time series are 0 1, then one pulse signal is currently received, the current value is 1, the historical value is 0, and the absolute value of the difference is 1. Thus, the second preset condition is met, the display state information is generated to be lighting-up (represented by ), and a signal is sent to the drive circuit of the display unit to light up the display unit. When two consecutive pulse signals in the time series are 1 0, the current value is 0, the historical value is 1, and the absolute value of the difference is 1. Thus, the second preset condition is met, the display state information is generated to be lighting-off (represented by ), and a signal is sent to the drive circuit of the display unit to turn off the display unit. When two consecutive frames in the time series are 0 0 or 1 1, the absolute value of the difference is 0, so that the second preset condition is not met and no display state information is generated. Where there is no change in the display state information, no display signal is sent, such as indicated by "X" in FIG. 10.

EXAMPLE 5

Figure 11:
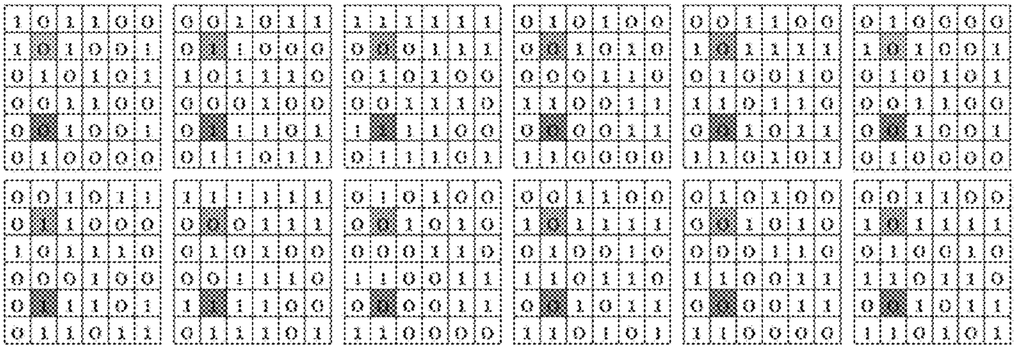
FIG. 11 is a schematic diagram of target pulse sequences according to another embodiment of the present disclosure.

In the example of FIG. 11, the generation resolution R1 of the input target pulse sequences is the same as the display resolution R2 of the target display array, both of which are 6*6 (i.e., W=H=6). The generation rate V1 of the target pulse sequences is equal to 40,000 frames/second, while the display rate upper limit V2 of the display unit is 10,000 frames/second.

For the pulse signals during 12/40,000 seconds (the number 12/40,000 here is based on the fact that a pulse frame is generated every 1/40,000 seconds and that 12 pulse frames are illustrated in FIG. 11), according to the input order, the target pulse sequences as shown in FIG. 11 can be obtained (the pulse signals that are input first come first, and the pulse signals that are input later come later).

Figure 12:
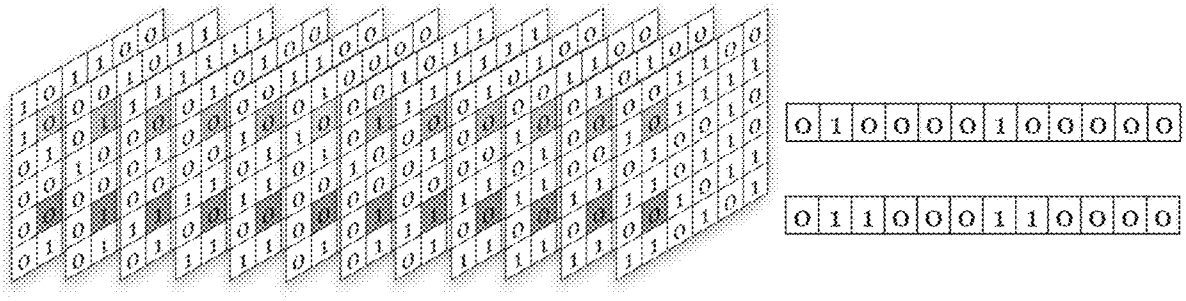
FIG. 12 is a schematic diagram of pulse signals corresponding to a display unit according to an embodiment of the present disclosure.
Figure 13:
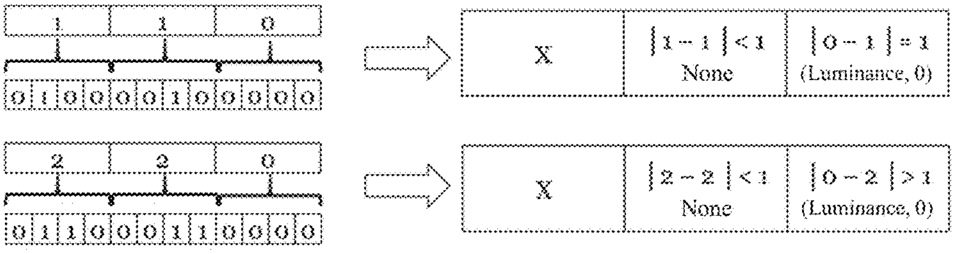
FIG. 13 is a schematic display diagram of a display method based on pulse signals according to another embodiment of the present disclosure.

With the resolution of 6*6 and the input order, the target pulse sequences correspond to 12 pulse planes (pulse frames) as shown in FIG. 11, in which the pulse planes input first are on the left, and the pulse planes input later are on the right. As shown in FIG. 12, with the resolutions being the same, each display unit spatially corresponds to one pulse position in a pulse plane, which is different from the fourth embodiment where each display unit corresponds to the pulse signals at one pulse position in 4 pulse planes. With the set duration in the first preset condition being 4/40,000 seconds, four pulse signals are accumulated, and the obtained accumulated pulse signal value is used as the current value corresponding to the display unit. The numerical relationship is the absolute value of the difference, and the second preset condition is the numerical relationship not less than 1. A luminance value is obtained as the display state information by multiplying the current value by a preset value L.

As shown in FIG. 12, taking the two regions (2, 2) and (5, 2) in the target pulse sequences as an example, the 12 pulse signals at the position (2, 2) are {0 1 0 0 0 0 1 0 0 0 0 0}, and a sequence of the accumulated values generated on the basis of 4 pulse signals per group is {1 1 0}. When the current value for the display unit is 0, the historical value is 1, and the second preset condition is met. Then a luminance value is calculated from the current value 0 as the display state information. The display signal sent is in the form of (luminance, 0), for example. The 12 pulse signals at the position (5, 2) are {0 1 1 0 0 0 1 1 0 0 0 0}, and the sequence of accumulated values generated on the basis of 4 pulse signals per group is {2 2 0}. Similarly, when the current value for the display unit is 0, the historical value is 2, and a display signal of (luminance, 0) is to be sent. In one embodiment, when the second preset condition is not met, the display state information is not generated, and the display signal may not be sent, such as indicated by "X" in FIG. 13.

In some cases, if the current value is 4 and the historical value is 2, a display signal of (luminance, 4 L) is sent.

EXAMPLE 6

Figure 14:
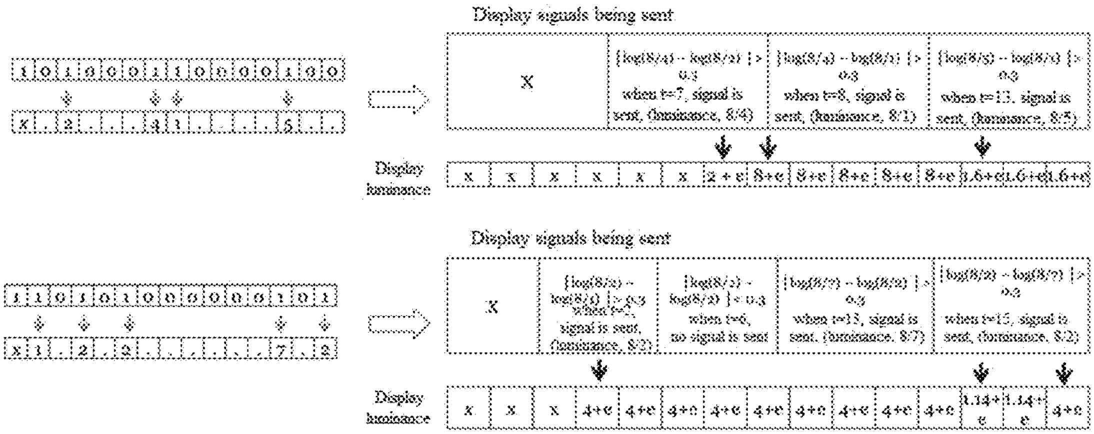
FIG. 14 is a schematic display diagram of a display method based on pulse signals according to another embodiment of the present disclosure.

In the example of FIG. 14, the generation resolution R1 of the input target pulse sequences is the same as the display resolution R2 of the target display array, both of which are 6*6 (i.e., W=H=6), and the generation rate V1 of the target pulse sequences is equal to 40,000 frames/second.

For the pulse signals during a period of 15/40,000 seconds (the number 15/40,000 here is based on the fact that a pulse frame is generated every 1/40,000 seconds and that 15 pulse frames are illustrated in this example), a bit stream including 540 bits in total represents the pulse data. According to the same method as the first and second examples, assuming that the pulse signals at the position (2, 2) are {1, 0, 1, 0, 0, 0, 1, 1, 0, 0, 0, 0, 1, 0, 0}, and the pulse signals at the position (5, 2) are { 1, 1, 0, 1, 0, 1, 0, 0, 0, 0, 0, 0, 1, 0, 1}. The first preset condition is that the cyclically accumulated value of the pulse signals reaches the second preset threshold. When the first preset condition is met, the current value for the display unit is calculated according to Lv(T)=C/ΔT', where C=8, and ΔT' is the time interval between two neighboring time points at which the accumulated value of the pulse signals reaches the second preset threshold.

As shown in FIG. 14, "e" is a display constant for fill light. Assuming that the second preset threshold in the first preset condition is 1, the current value is calculated every time a pulse is received. The ΔT's corresponding to respective pulse signals at the position (2, 2) are {X, •, 2, •, •, •, 4, 1, •, •, •, •, 5, •,•}. The ΔT's corresponding to respective pulse signals at the position (5, 2) are {X, 1, •, 2, •, 2, •, •, •, •, •, •, 7, •, 2}. The sign "." represents that the first preset condition is not met. The numerical relationship between the current value and the historical value is the absolute value of the difference between logarithmic function values. When the numerical relationship is greater than 0.3, the display state information is sent, and the display state information is the luminance value calculated according to the current value. That is, the second preset condition is the numerical relationship greater than 0.3. When the second preset condition is met, the luminance value is obtained as e+current value.

EXAMPLE 7

Figure 15:
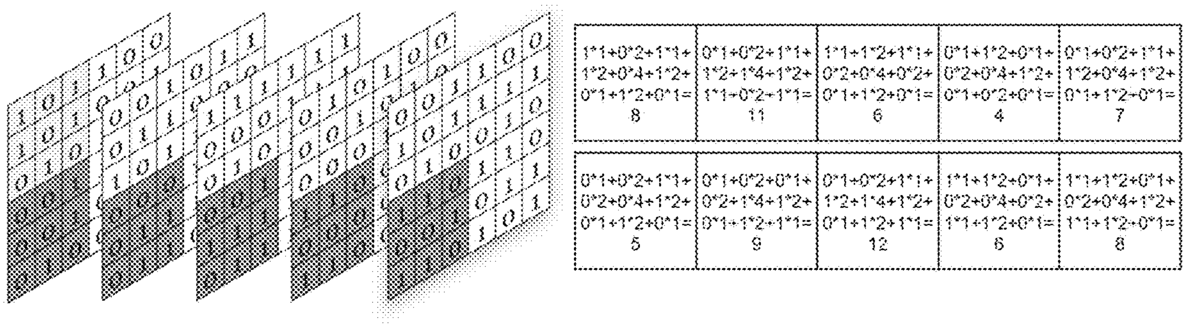
FIG. 15 is a schematic diagram of determining an accumulated pulse signal value according to another embodiment of the present disclosure.

In the example of FIG. 15, when the resolution of the target pulse sequences is different from that of the target display array, an approach of block accumulation on the target pulse sequence plane is adopted. The specific implementation is as follows.

The generation resolution R1 of the input target pulse sequences is 6*6, and the display resolution R2 of the target display array is 2*2. The generation rate V1 of the target pulse sequences is equal to 40,000 frames/second. And the received target pulse sequences are the same as those of the first kind of examples.

With the resolution R1/R2=9, each display unit corresponds to 9 pulse positions in a pulse plane, in which case 9 pulse positions of the 5 pulse planes are accumulated, using a weighted accumulation method. The weight matrix is

| | | |
|---|---|---|
| 1 | 2 | 1 |
| 2 | 4 | 2 |
| 1 | 2 | 1 |

Figure 16:
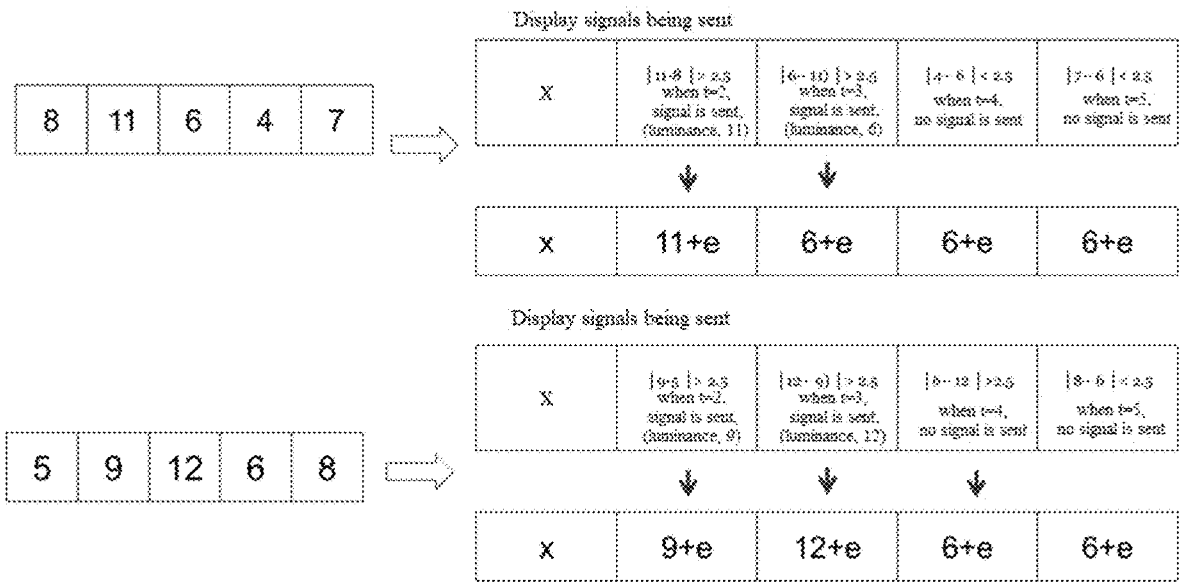
FIG. 16 is a schematic display diagram of a display method based on pulse signals according to another embodiment of the present disclosure.

As shown in FIG. 16, for a 2*2 target display array plane, the accumulated pulse signal values at the position (1, 1) are {8, 11, 6, 4, 7}, and the accumulated pulse signal values at the position (2, 1) are {5, 9, 12, 6, 8}. The absolute value of the difference between the current value and the historical value is compared with the third preset threshold value of 2.5. When it is not less than 2.5, a luminance value is calculated according to the current value as the display state information to control the luminance of lighting. In this embodiment, the display state information of the display unit is determined from a change in the pulse signals corresponding to the display unit. For example, in this embodiment, the elapse of a set duration may be used as the first preset condition, and the set duration may be a duration for displaying one frame of image. Within the set duration, the weighted and accumulated value of the pulse signals at 9 pulse positions can be used as the current value for the display unit. The historical value is the value corresponding to the display unit when the set duration elapses last time.

When the numerical relationship between the current value and the historical value (the absolute value of the difference) meets the second preset condition (greater than or equal to the third preset threshold), a luminance value can be obtained as e+current value.

In addition, it should be noted that the illustration of the pulse plane(s) is used in the above-mentioned embodiments to elucidate the spatiotemporal relationship; however the pulse plane(s) may not be actually generated in the method. Instead, the pulse signals corresponding to the display unit may be directly determined according to the position information of the pulse signals in the pulse plane.

Figure 17:
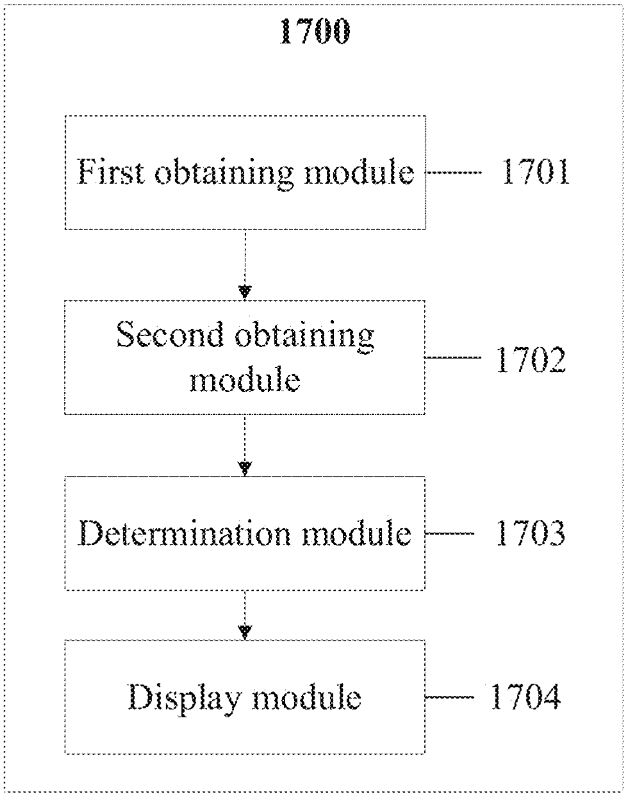
FIG. 17 is a schematic structural diagram of a display apparatus based on pulse signals according to an embodiment of the present disclosure.

In another embodiment of the present disclosure, as shown in FIG. 17, a display apparatus 1700 based on pulse signals is further provided. The pulse signal-based display apparatus 1700 includes a first obtaining module 1701, a second obtaining module 1702, a determination module 1703 and a display module 1704.

The first obtaining module 1701 is configured to obtain information of a target display array on a display device, with the target display array including a first number of display units arranged. The second obtaining module 1702 is configured to obtain target pulse sequences that characterize dynamic spatiotemporal information. The determining module 1703 is configured to determine display state information of each display unit in the first number of display units from the spatiotemporal relationship between the target pulse sequences and the target display array. The display module 1704 is configured to cause visualization of pulse signals in the target pulse sequences on the display device based on the display state information of each display unit in the first number of display units.

In this disclosure, the information of the target display array, including a first number of display units arranged, on the display device can be obtained. The target pulse sequences used to characterize the dynamic spatiotemporal information are obtained. The display state information of each display unit is determined according to the spatiotemporal relationship between the target pulse sequences and the target display array. The visualization of the pulse signals on the display device is realized based on the display state information of each display unit. The technical solution of the present disclosure can determine the display state information of each display unit on the display device from the spatiotemporal relationship between the target pulse sequences and the target display array, so as to realize complete display of the optical signal information recorded in the target pulse sequences, thereby facilitating accurate reproduction of the change process of optical signals of an original scene. Since the process does not involve traditional image reconstruction, the disadvantage of losing the information carried by the original pulse signals in the prior art is also avoided.

In another embodiment of the present disclosure, the information of the target display array includes the display resolution of the target display array. The determining module 1703 is further configured to determine the spatiotemporal relationship between the target pulse sequences and the target display array based on the display resolution and the generation resolution of the target pulse sequences.

In another embodiment of the present disclosure, the information of the target display array includes a display rate of the target display array. The determining module 1703 is further configured to determine the spatiotemporal relationship between the target pulse sequences and the target display array based on the display rate and the generation resolution of the target pulse sequences.

In another embodiment of the present disclosure, the information of the target display array includes a display resolution and a display rate of the target display array. The determining module 1703 is further configured to determine the spatiotemporal relationship between the target pulse sequences and the target display array based on the display resolution and the generation resolution of the target pulse sequences, as well as the display rate and the generation rate of the target pulse sequences.

In another embodiment of the present disclosure, the determining module 1703 is configured to determine a first proportional relationship between the generation resolution and the display resolution, and to determine the spatiotemporal relationship between the target pulse sequences and the target display array based on the first proportional relationship.

In another embodiment of the present disclosure, the determining module 1703 is configured to determine a second proportional relationship between the generation rate and the display rate, and to determine the spatiotemporal relationship between the target pulse sequences and the target display array based on the second proportional relationship.

In another embodiment of the present disclosure, the determining module 1703 is configured to determine a first proportional relationship between the generation resolution and the display resolution, and a second proportional relationship of the generation rate to the display rate, and to determine the spatiotemporal relationship between the target pulse sequences and the target display array based on the first proportional relationship and the second proportional relationship.

In another embodiment of the present disclosure, the determining module 1703 is configured to determine from the target pulse sequences respective pulse signals corresponding to each display unit in the first number of display units according to the spatiotemporal relationship, to accumulate the pulse signals corresponding to the display unit to obtain an accumulated pulse signal value, and to generate the display state information based on the accumulated pulse signal value.

In another embodiment of the present disclosure, the determining module 1703 is configured to compare the accumulated pulse signal value with a first preset threshold to obtain a comparison result, and to generate the display state information based on the comparison result.

In another embodiment of the present disclosure, the determining module 1703 is configured to obtain the display state information from a preset function of the accumulated pulse signal value.

In another embodiment of the present disclosure, the determining module 1703 is configured to determine from the target pulse sequences respective pulse signals corresponding to each display unit in the first number of display units according to the spatiotemporal relationship, and to determine the display state information from a change in the pulse signals corresponding to the display unit.

In another embodiment of the present disclosure, the determining module 1703 is configured to calculate a current value corresponding to the display unit from the pulse signals corresponding to the display unit every time when a first preset condition is met, to determine a numerical relationship between the current value and the historical value, the historical value being the value corresponding to the display unit when the first preset condition was met last time, and to determine the display state information when the numerical relationship meets a second preset condition.

In another embodiment of the present disclosure, the first preset condition is elapse of a set duration, and the determining module 1703 is configured to accumulate the pulse signals corresponding to the display unit within the set duration to obtain an accumulated pulse signal value as the current value.

In another embodiment of the present disclosure, the first preset condition is that a cyclically accumulated value of the pulse signal received by the display unit reaches the second preset threshold, and the determining module 1703 is configured to calculate the current value from a time interval between two neighboring time points at which the cyclically accumulated value of the pulse signals reaches the second preset threshold that is a maximum value of the cyclic accumulation.

In another embodiment of the present disclosure, the determining module 1703 is configured to determine the display state information based on the current value when the numerical relationship meets the second preset condition.

In another embodiment of the present disclosure, the display module 1704 is configured to control a display state of the display unit according to the display state information to realize the visualization of the pulse signals in the target pulse sequences on the display device.

In another embodiment of the present disclosure, the display state information includes at least one of a lighting-up state, a lighting-off state, a voltage value, a luminance value, and a duration of lighting-up.

Figure 18:
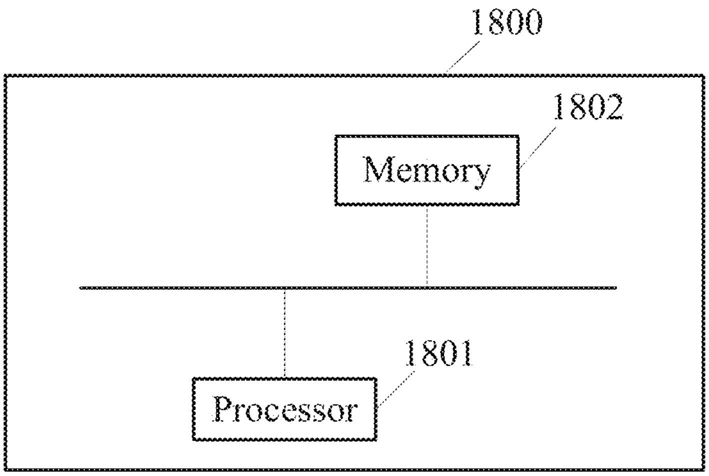
FIG. 18 is a schematic structural diagram of an electronic device according to an embodiment of the present disclosure.

FIG. 18 is a block diagram showing a logical structure of an electronic device according to an example embodiment. For example, electronic device 1800 may be a mobile phone, a computer, a digital broadcast terminal, a messaging device, a game console, a tablet device, a medical device, a fitness device, a personal digital assistant, a display device, and the like.

In an example embodiment, there is also provided a non-transitory computer-readable storage medium including instructions, such as a memory including instructions, the instructions can be executed by an electronic device processor to complete the above-mentioned pulse signal-based display method, the method includes: obtaining information of a target display array on the display device, where the target display array includes a first number of display units arranged; obtaining target pulse sequences that characterize dynamic spatiotemporal information; determining the display state information of each display unit in the first number of display units according to the spatiotemporal relationship between the target pulse sequences and the target display arrays; causing the visualization of the pulse signals in the target pulse sequences on the display device based on the display state information of each display unit in the first number of display units. In some embodiments, the above-mentioned instructions may also be executed by the processor of the electronic device to complete other steps involved in the above-mentioned exemplary embodiments. For example, the non-transitory computer-readable storage medium may be a ROM, a random access memory (RAM), a CD-ROM, a magnetic tape, a floppy disk, an optical data storage device, and the like.

In an example embodiment, an application program/computer program product is also provided, including one or more instructions, which can be executed by a processor of an electronic device to implement the above-mentioned pulse signal-based display method. The method includes: obtaining information of a target display array on the display device, where the target display array includes a first number of display units; obtaining target pulse sequences that characterize dynamic spatiotemporal information; determining display state information of each display unit in the first number of display units from a spatiotemporal relationship between the target pulse sequences and the target display arrays; causing visualization of the pulse signals in the target pulse sequences on the display device based on the display state information of each display unit in the first number of display units. In some embodiments, the instructions may also be executed by the processor of the electronic device to implement other steps involved in the above-mentioned example embodiments.

Those skilled in the art can understand that FIG. 18 is only an example of the electronic device (or computer device) 1800 and does not constitute a limitation on the electronic device 1800. It may include more or less components than those shown, or combine some components or a different component. For example, the electronic device 1800 may further include an input and output device, a network access device, a bus, and the like. The electronic device 1800 may include a processor 1801 and a memory 1802.

The so-called processor 1801 may be a Central Processing Unit (CPU), and may also be other general-purpose processors, Digital Signal Processors (DSPs), Application Specific Integrated Circuits (ASICs), Field-Programmable Gate Arrays (FPGAs) or other programmable logic devices, discrete gate or transistor logic devices, discrete hardware components, etc. The general-purpose processor can be a microprocessor or the processor 1801 can also be any conventional processor, etc. The processor 1801 is the control center of the electronic device 1800 and connects to various parts of the entire electronic device 1800 with various interfaces and circuits.

The memory 1802 can be used to store computer-readable instructions, and the processor 1801 implements various functions of the electronic device 1800 by running or executing the computer-readable instructions or modules stored in the memory 1802 and calling data stored in the memory 1802. The memory 1802 may mainly include a stored program area and a stored data area, wherein the stored program area may store an operating system, an application program (such as a sound playback function, an image playback function, etc.) required for at least one function, and the like, data created by the use of the electronic device 1800, and the like. In addition, the memory 1802 may include a hard disk, a memory, a plug-in hard disk, a Smart Media Card (SMC), a Secure Digital (SD) card, a Flash Card (Flash Card), at least one disk storage device, a flash memory device, Read-Only Memory (ROM), Random Access Memory (RAM), or other non-volatile/volatile storage devices.

If the modules integrated in the electronic device 1800 are implemented in the form of software functional modules and sold or used as independent products, they may be stored in a computer-readable storage medium. Based on this understanding, the present disclosure can implement all or part of the processes in the methods of the above embodiments and can also be completed by instructing relevant hardware through computer-readable instructions, and the computer-readable instructions can be stored in a computer-readable storage medium. The computer-readable instructions, when executed by the processor, can implement the steps of the various method embodiments described above.

Other embodiments of the present disclosure will readily occur to those skilled in the art upon consideration of the specification and practice of the embodiments disclosed herein. This disclosure is intended to cover any variations, uses or adaptations of this disclosure that follow the general principles of this disclosure and include common knowledge or conventional techniques in the technical field not disclosed in this disclosure. The specification and embodiments are to be regarded as examples only, with the true scope and spirit of the disclosure being indicated by the claims of the disclosure.

It is to be understood that the present disclosure is not limited to the precise structures described above and shown in the accompanying drawings and that various modifications and changes may be made without departing from the scope thereof. The scope of the disclosure is limited only by the appended claims.

What is claimed is:

1. A display method, comprising:

obtaining information of a target display array on a display device, the target display array including a first number of display units arranged;

obtaining target pulse sequences that characterize dynamic spatiotemporal information;

determining display state information of each display unit in the first number of display units from a spatiotemporal relationship between the target pulse sequences and the target display array; and causing visualization of pulse signals in the target pulse sequences on the display device based on the display state information of each display unit in the first number of display units.

2. The method according to claim 1, wherein the information of the target display array comprises a display resolution of the target display array, and wherein the method further comprises:

determining the spatiotemporal relationship between the target pulse sequences and the target display array based on the display resolution and a generation resolution of the target pulse sequences.

3. The method according to claim 1, wherein the information of the target display array comprises a display rate of the target display array, and wherein the method further comprises:

determining the spatiotemporal relationship between the target pulse sequences and the target display array based on the display rate and a generation rate of the target pulse sequences.

4. The method according to claim 1, wherein the information of the target display array comprises a display resolution and a display rate of the target display array, and wherein the method further comprises:

determining the spatiotemporal relationship between the target pulse sequences and the target display array based on the display resolution and the generation resolution of the target pulse sequences, and the display rate and the generation rate of the target pulse sequences.

5. The method according to claim 2, wherein the determining the spatiotemporal relationship between the target pulse sequences and the target display array based on the display resolution and the generation resolution of the target pulse sequence comprises:

determining a first proportional relationship between the generation resolution and the display resolution; and determining the spatiotemporal relationship between the target pulse sequences and the target display array based on the first proportional relationship.

6. The method according to claim 3, wherein the determining the spatiotemporal relationship between the target pulse sequence and the target display array based on the display rate and the generation rate of the target pulse sequence comprises:

determining a second proportional relationship between the generation rate and the display rate; and determining the spatiotemporal relationship between the target pulse sequences and the target display array based on the second proportional relationship.

7. The method according to claim 4, wherein the determining the spatiotemporal relationship between the target pulse sequences and the target display array based on the display resolution and the generation resolution of the target pulse sequences, and the display rate and the generation rate of the target pulse sequences comprises:

determining a first proportional relationship between the generation resolution and the display resolution, and a second proportional relationship between the generation rate and the display rate; and determining the spatiotemporal relationship between the target pulse sequences and the target display array based on the first proportional relationship and the second proportional relationship.

8. The method according to claim 1, wherein the determining the display state information of each display unit in the first number of display units from the spatiotemporal relationship between the target pulse sequences and the target display array comprises:

determining, from the target pulse sequences, respective pulse signals corresponding to each display unit in the first number of display units according to the spatiotemporal relationship;

accumulating the pulse signals corresponding to the display unit to obtain an accumulated pulse signal value; and generating the display state information based on the accumulated pulse signal value.

9. The method according to claim 8, wherein the generating the display state information based on the accumulated pulse signal value comprises:

comparing the accumulated pulse signal value with a first preset threshold to obtain a comparison result; and generating the display state information based on the comparison result.

10. The method according to claim 8, wherein the generating the display state information based on the accumulated pulse signal value comprises:

obtaining the display state information from a preset function of the accumulated pulse signal value.

11. The method according to claim 1, wherein the determining display state information of each display unit in the first number of display units from the spatiotemporal relationship between the target pulse sequences and the target display array comprises:

determining, from the target pulse sequence, respective pulse signals corresponding to each display unit in the first number of display units according to the spatiotemporal relationship; and determining the display state information from a change in the pulse signals corresponding to the display unit.

12. The method according to claim 11, wherein the determining the display state information from the change in the pulse signals corresponding to the display unit comprises:

calculating a current value corresponding to the display unit from the pulse signals corresponding to the display unit every time when a first preset condition is met;

determining a numerical relationship between the current value and a historical value, wherein the historical value is the value corresponding to the display unit when the first preset condition was met last time; and determining the display state information when the numerical relationship meets a second preset condition.

13. The method according to claim 12, wherein the first preset condition is elapse of a set duration, and wherein the calculating the current value corresponding to the display unit from the pulse signals corresponding to the display unit comprises:

accumulating the pulse signals corresponding to the display unit within the set duration to obtain an accumulated pulse signal value as the current value.

14. The method according to claim 12, wherein the first preset condition is that a cyclically accumulated value of the pulse signals received by the display unit reaches a second preset threshold that is a maximum value of the cyclic accumulation, and wherein the calculating the current value corresponding to the display unit from the pulse signals corresponding to the display unit comprises:

calculating the current value from a time interval between two neighboring time points at which the cyclically accumulated value of the pulse signals reaches the second preset threshold.

15. The method according to claim 12, wherein the determining the display state information when the numerical relationship meets the second preset condition comprises:

determining the display state information based on the current value when the numerical relationship meets the second preset condition.

16. The method according to claim 1, wherein the causing visualization of the pulse signals in the target pulse sequences on the display device based on the display state information of each display unit in the first number of display units comprises:

controlling a display state of the display unit according to the display state information to realize the visualization of the pulse signals in the target pulse sequences on the display device.

17. The method according to claim 1, wherein the display state information comprises at least one of a lighting-up state, a lighting-off state, a voltage value, a luminance value, and a duration of lighting-up.

18. An electronic device, comprising:

one or more processors; and one or more memory storing one or more programs, which when executed by the one or more processors, cause the electronic device to perform operations comprising:

obtaining information of a target display array on a display device, the target display array including a first number of display units arranged;

obtaining target pulse sequences that characterize dynamic spatiotemporal information;

determining display state information of each display unit in the first number of display units from a spatiotemporal relationship between the target pulse sequences and the target display array; and causing visualization of pulse signals in the target pulse sequences on the display device based on the display state information of each display unit in the first number of display units.

19. The electronic device according to claim 18, wherein the causing visualization of the pulse signals in the target pulse sequences on the display device based on the display state information of each display unit in the first number of display units comprises:

controlling a display state of the display unit according to the display state information to realize the visualization of the pulse signals in the target pulse sequences on the display device.

20. A non-transitory computer-readable storage medium storing one or more programs, the one or more programs comprising instructions which, when executed by one or more processors of an electronic device, cause the electronic device to perform operations comprising:

obtaining information of a target display array on a display device, the target display array comprising a first number of display units arranged;

obtaining target pulse sequences that characterize dynamic spatiotemporal information;

determining display state information of each display unit in the first number of display units from a spatiotemporal relationship between the target pulse sequences and the target display array; and causing visualization of pulse signals in the target pulse sequences on the display device based on the display state information of each display unit in the first number of display units.

* * * * *